US012034866B2

(12) United States Patent
Ilani

(10) Patent No.: US 12,034,866 B2
(45) Date of Patent: Jul. 9, 2024

(54) SYSTEMS AND METHODS OF IMPROVED MODULAR INVERSION WITH DIGITAL SIGNATURES

(71) Applicant: Western Digital Technologies, Inc., San Jose, CA (US)

(72) Inventor: Ishai Ilani, Dolev (IL)

(73) Assignee: Western Digital Technologies, Inc., San Jose, CA (US)

( * ) Notice: Subject to any disclaimer, the term of this patent is extended or adjusted under 35 U.S.C. 154(b) by 228 days.

(21) Appl. No.: 17/827,692

(22) Filed: May 28, 2022

(65) Prior Publication Data

US 2023/0388134 A1 Nov. 30, 2023

(51) Int. Cl.
*H04L 9/32* (2006.01)
*H04L 9/08* (2006.01)
*H04L 9/30* (2006.01)

(52) U.S. Cl.
CPC .......... *H04L 9/3252* (2013.01); *H04L 9/0825* (2013.01); *H04L 9/3066* (2013.01)

(58) Field of Classification Search
CPC ... H04L 9/3252; H04L 9/0825; H04L 9/3066; H04L 9/08; H04L 9/30; H04L 9/3263; H04L 9/0844; H04L 9/32
See application file for complete search history.

(56) References Cited

U.S. PATENT DOCUMENTS

| | | | |
|---|---|---|---|
| 9,800,411 B1* | 10/2017 | Brown | H04W 12/06 |
| 2018/0336015 A1* | 11/2018 | Roetteler | G06N 10/00 |
| 2019/0007219 A1 | 1/2019 | Ghosh et al. | |
| 2021/0250185 A1 | 8/2021 | Bhattacharya | |
| 2022/0085973 A1 | 3/2022 | Honorio Araujo da Silva et al. | |
| 2022/0166614 A1 | 5/2022 | Tunstall et al. | |

FOREIGN PATENT DOCUMENTS

WO 2022022924 A1 2/2022

* cited by examiner

*Primary Examiner* — Quazi Farooqui
(74) *Attorney, Agent, or Firm* — Armstrong Teasdale LLP

(57) ABSTRACT

A method includes receiving a message and a digital signature associated with a signing party and the message, verifying authenticity of the digital signature using elliptic curve cryptography (ECC), and authenticating use of the message based, at least in part, on the confirmed authenticity of the digital signature. The verifying includes one or more computations involving computing modular inverses. Computing modular inverses includes identifying first and second integer of a modular inverse operation, performing a first iterative process that, at each iteration: (i) initializes a third integer with a pre-defined number of most significant bits of the first integer and a fourth integer with the pre-defined number of most significant bits of the second integer and (ii) computes a quotient and a remainder, determining a resultant inverse value using the quotient; and confirming the authenticity of the digital signature based, at least in part, on the resultant inverse value.

20 Claims, 7 Drawing Sheets

SYSTEMS AND METHODS OF IMPROVED MODULAR INVERSION WITH DIGITAL SIGNATURES

BACKGROUND

The exchange of digital messages (e.g., documents, downloaded software, or the like) using the Internet has given rise to the need for ways to both verify the authenticity and integrity of such content. Electronic signatures are commonly used in many cryptographic protocol suites. For example, digital signatures use techniques of asymmetric cryptography, or public-key cryptography, to provide aspects of validation and security to messages, many of which may be sent through insecure channels. In public-key cryptography, a message sender (or "signing party") generates a public/private key pair and generates a digital signature for a message using the private key. The sender then shares both the message, the digital signature, and their public key with a recipient. The recipient then uses the sender's public key to verify the digital signature of the sender, establishing trust that the message is from the trusted sender, as well as to verify the integrity of the message, establishing confidence that the message was not tampered with or corrupted.

One such public-key cryptosystem is RSA (Rivest-Shamir-Adleman). RSA relies on the use of two large prime numbers and an auxiliary value to generate the key pair. The security level of RSA relies upon the size of the key (e.g., in bits) and the difficulty in factorization of large numbers. However, the key size under RSA needs to be large in order to establish sufficient security to protect against cracking. Another example public-key cryptosystem is ECC (elliptical curve cryptography). ECC utilizes the algebraic structure of elliptic curves over finite fields to generate key pairs and to verify digital signatures. ECC is generally considered to be more secure than RSA based on its complex nature. Further, as compared to RSA, the key size of ECC keys can provide a similar security level with significantly fewer bits. For example, an RSA key size of 1,024 bits is considered equivalent to an ECC key size of 160-223 bits. Such reduction in key size provides benefits to computational needs that may be constrained in various devices, such as mobile devices, automobiles, wearable devices, Internet of Things ("IoT") devices, or the like.

However, verification of ECC keys can be computationally intensive, using hundreds or thousands of mathematical operations on large numbers. What is needed is a system and method for reducing the computational complexity of operations under ECC.

SUMMARY

The present application describes a method. The method includes receiving a message and a digital signature associated with a signing party and the message, the digital signature being created by the signing party using a private key of a key pair. The method also includes verifying authenticity of the digital signature using elliptic curve cryptography (ECC) and a public key of the key pair, the verifying including one or more computations involving computing modular inverses. Computing modular inverses includes: (A) identifying a first integer and second integer of a modular inverse operation, the first integer representing an inverse number, the second integer representing the modulus, (B) performing a first iterative process that, at each iteration: (i) initializes a third integer with a pre-defined number of most significant bits of the first integer and a fourth integer with the pre-defined number of most significant bits of the second integer; and (ii) computes a quotient and a remainder using the third integer and the fourth integer; (C) determining a resultant inverse value for the modular inverse operation based, at least in part, on the quotient; and (D) confirming the authenticity of the digital signature based, at least in part, on the resultant inverse value. The method also includes authenticating use of the message based, at least in part, on the confirmed authenticity of the digital signature.

The present application also describes a computing device that includes a memory storing a software package and a digital signature associated with a signing party and the software package, the digital signature being created by the signing party using a private key of a key pair. The computing device also includes at least one processor, coupled to the memory, and executing instructions that cause the at least one processor to: (I) receive the software package, the digital signature, and a public key of the signing party; (II) verify authenticity of the digital signature using elliptic curve cryptography (ECC) and a public key of the key pair, the verifying including one or more computations involving computing modular inverses, wherein computing modular inverses includes: (A) identifying a first integer and second integer of a modular inverse operation, the first integer representing an inverse number, the second integer representing the modulus; (B) performing a first iterative process that, at each iteration: (i) initializes a third integer with a pre-defined number of most significant bits of the first integer and a fourth integer with the pre-defined number of most significant bits of the second integer; and (ii) computes a quotient and a remainder using the third integer and the fourth integer; (C) determining a resultant inverse value for the modular inverse operation based, at least in part, on the quotient; and (D) confirming the authenticity of the digital signature based, at least in part, on the resultant inverse value; and (III) initiate installation of the software package on the computing device based, at least in part, on the confirmed authenticity of the digital signature.

The present application further describes a non-volatile memory storing instructions that, when executed by at least one processor, cause the at least one processor to: (I) receive a message and a digital signature associated with a signing party and the message, the digital signature being created by the signing party using a private key of a key pair; (II) verify authenticity of the digital signature using elliptic curve cryptography (ECC) and a public key of the key pair, the verifying including one or more computations involving computing modular inverses, computing modular inverses includes: (A) identifying a first integer and second integer of a modular inverse operation, the first integer representing an inverse number, the second integer representing the modulus; (B) performing a first iterative process that, at each iteration: (i) initializes a third integer with a pre-defined number of most significant bits of the first integer and a fourth integer with the pre-defined number of most significant bits of the second integer; and (ii) computes a quotient and a remainder using the third integer and the fourth integer; (C) determining a resultant inverse value for the modular inverse operation based, at least in part, on the quotient; and (D) confirming the authenticity of the digital signature based, at least in part, on the resultant inverse value; and (III) authenticate use of the message based, at least in part, on the confirmed authenticity of the digital signature.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
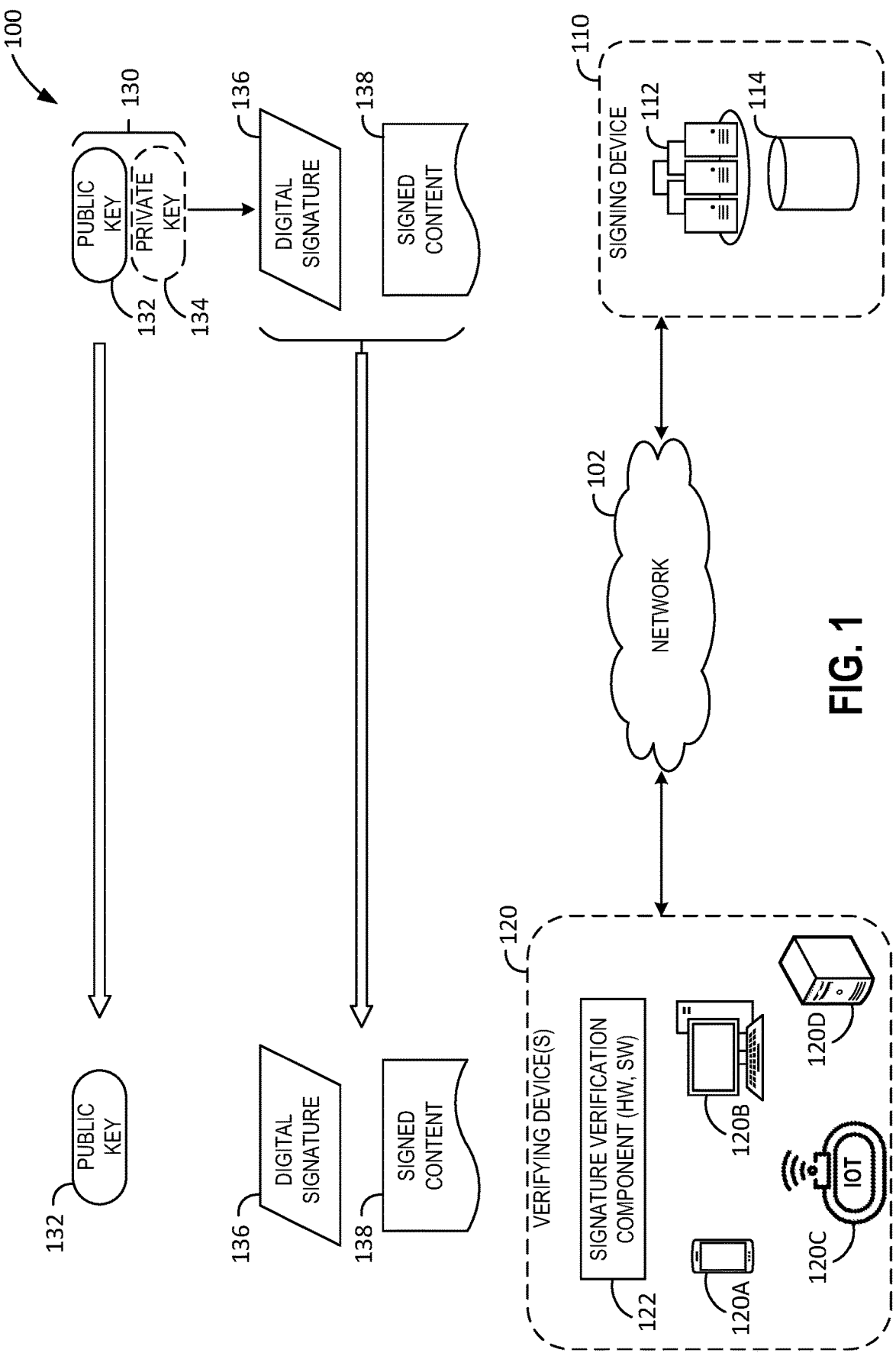
FIG. 1 is a block diagram of an example digital signature system and associated data flow for providing signed digital content between users of the system.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present application describes systems and methods for improved digital signature use under elliptic curve cryptography (ECC). Many types of computing devices benefit from the use of public key cryptographic systems for message verification (e.g., authentication, integrity) and encryption. For example, computing devices such as automobile systems, smart phones, home electronics and appliances, Internet-of-Things ("IoT") connected devices, or various embedded electronic devices such as hard drive controllers ("HDDs"), solid state drives ("SSDs"), or the like, may regularly download and install software or firmware. Such use cases can benefit from the protections of digital signatures on downloads to, for example, verify that the downloads are from a trusted source and ensure that the integrity of the files are uncompromised. However, many such devices may have limited computing resources that can impose significant constraints on use of ECC digital signatures (e.g., restrictive memory, processing, storage) or lead to excessive latency, power consumption, or the like.

Traditional digital signature verification under ECC includes performing hundreds or thousands of computational operations using large integers (e.g., 128+ bits) to verify a given digital signature. Elliptic curve operations performed under ECC include high level operations on the elliptic curve, such as point addition (e.g., P+Q), point doubling (e.g., Q+Q), and computing each of the high level operations requires a number of low level operations, such as addition and subtraction modulo p, multiplication modulo p, and computing multiplication inverses modulo p, where p is a large prime number which is part of the definition of the specific elliptic curve. Computing modular inverses on these large integers are computationally intensive tasks. Such ECC operations include a traditional application of Euclid's algorithm or extended Euclid algorithm ("EEA"), which is used to compute the greatest common divisor ("GCD") of two integers. Euclid's algorithms further may be performed on elliptic curves over finite fields, where division operations are replaced by modular inverse multiplication.

In order to provide certain performance improvements in such cryptographic systems, the present application describes systems and methods for providing ECC signature verification with reduced computational requirements over traditional systems. In an example, a digital signature system includes a signature verification component operating on a computing device (or "verification device," "receiving device"), such as a smart phone or IoT device. The verification device receives a digital signature and signed content (e.g., an encrypted or plaintext message, such as a software package), as well as a public key of a sender (or "signing device"). The verification device uses the public key of the sender to authenticate the digital signature and to verify the integrity of the signed content.

In an example, the signature verification component performs an improvement to the traditional Euclidean algorithm, referred to herein as "efficient extended Euclid algorithm" or "mutual Euclid" novel method. The present application recognizes that application of traditional EEA with large integers presents computationally intensive operations during an iterative process that finds GSDs of two large integers, n and m. The novel method reduces computational processing demands by reducing the size of the integers during the iterative process. More specifically, the novel method uses a particular number of most significant bits ("MSBs") of the large integers during some of the interim computations.

For example, the novel method introduces an intra-iteration process, or "short" iteration process, within each of the "long" iterations of the Euclidean algorithm. These "short" iterations use the 32 most significant bits of n and m to produce a 2×2 matrix, Q, ("Euclidean process matrix") that is sufficient for use in the long iteration. The use of 32 bits, rather than all 300+ bits of large integers n and m, reduces the complexity of computing the process matrix, Q. While this interim matrix, Q, of the short process may differ from the matrix determinations if all 300+ bits of the large integers were used, the novel method also includes checks to ensure that the smaller matrix, Q, is sufficient to progress the method to completion by shaving ~15-20 bits from the numbers n and m through each long iteration. As such, where a traditional application of EEA for 300-bit numbers, for example, uses ~300 iterations to complete, and each iteration is performed on 300-bit numbers, the novel method instead uses ~15 iterations on the long 300-bit numbers, and the remaining 285 iterations are performed on small 32-bit numbers.

These various benefits and examples will be described in greater detail below with reference to FIGS. 1-5C.

FIG. 1 is a block diagram of an example digital signature system 100 and associated data flow for providing signed digital content between users of the system. In the example embodiment, a sender and a receiver share content over a network 102 (e.g., the Internet) that is digitally signed by the sender and subsequently authenticated and verified by the receiver. The sender, in this example, is represented in the digital signature system 100 by a signing device 110, and the receiver is represented by a verifying device 120.

The signing device 110 may be, for example, a server system 112, a cloud system, or any such computing device that is configured to digitally sign content as described herein. The verifying device 120 may be, for example, a mobile computing device 120A (e.g., smart phone, tablet, wearable device, or the like), a personal computing device 120B (e.g., desktop PC, laptop PC, or the like), an IoT device 120C (e.g., appliance, electronics, automobile, or the like), a server computing device 120D, an embedded electronic device (not separately shown, e.g., a memory device, a storage device, or the like), or any such computing device that is configured to receive and verify digitally signed content. The verifying device(s) contain or otherwise include a signature verification component 122 that is configured to perform the various digital signature authentication and verification methods described herein. In some examples, the verifying device 120 may execute software that, when executed, performs such methods. In other examples, the verifying device 120 may include hardware components that are configured to perform such methods.

In some examples, the signing device 110 and verifying devices 120 use asymmetric cryptography and, more specifically, elliptic curve cryptography ("ECC") and public key encryption to securely exchange digitally signed content. During signature preparation, the signing device 110 generates a key pair 130 that includes a public key 132 and a private key 134 using ECC key generation (e.g., where, under ECC, the public key 132 includes a point on the elliptic curve, and where the private key 134 includes private parameters including a large integer that is kept secret). The public key 132 is shared with other systems, such as the verifying devices 120, and the private key 134 is kept private to the sender (e.g., to the signing device 110). In this example, the signing device 110 uses ECC digital signature generation to create a digital signature 136 for a content item using the private key 134. This content item is represented in FIG. 1 as signed content 138 and may be, for example, a software package or other such electronic document or file. In some examples, the signed content 138 may be encrypted by the sender (e.g., using the private key 134), where in other examples, the signed content 138 may be unencrypted content.

During signature verification, the verifying device 120 receives the digital signature 136 and signed content 138 from the network 102 (e.g., from the signing device 110), as well as the public key 132 of the sender. In some examples, the public key 132 may be provided by a trusted source, such as a certifying authority ("CA"), via a public key certificate. Here, it is presumed that the public key 132 is authentic to the sender. Accordingly, prior to use of the signed content 138, the signature verification component 122 of the verifying device 120 performs verification and validation of the sender and the signed contents 138 using the public key 132 of the sender, the digital signature 136, and the signed content 138.

Figure 2:
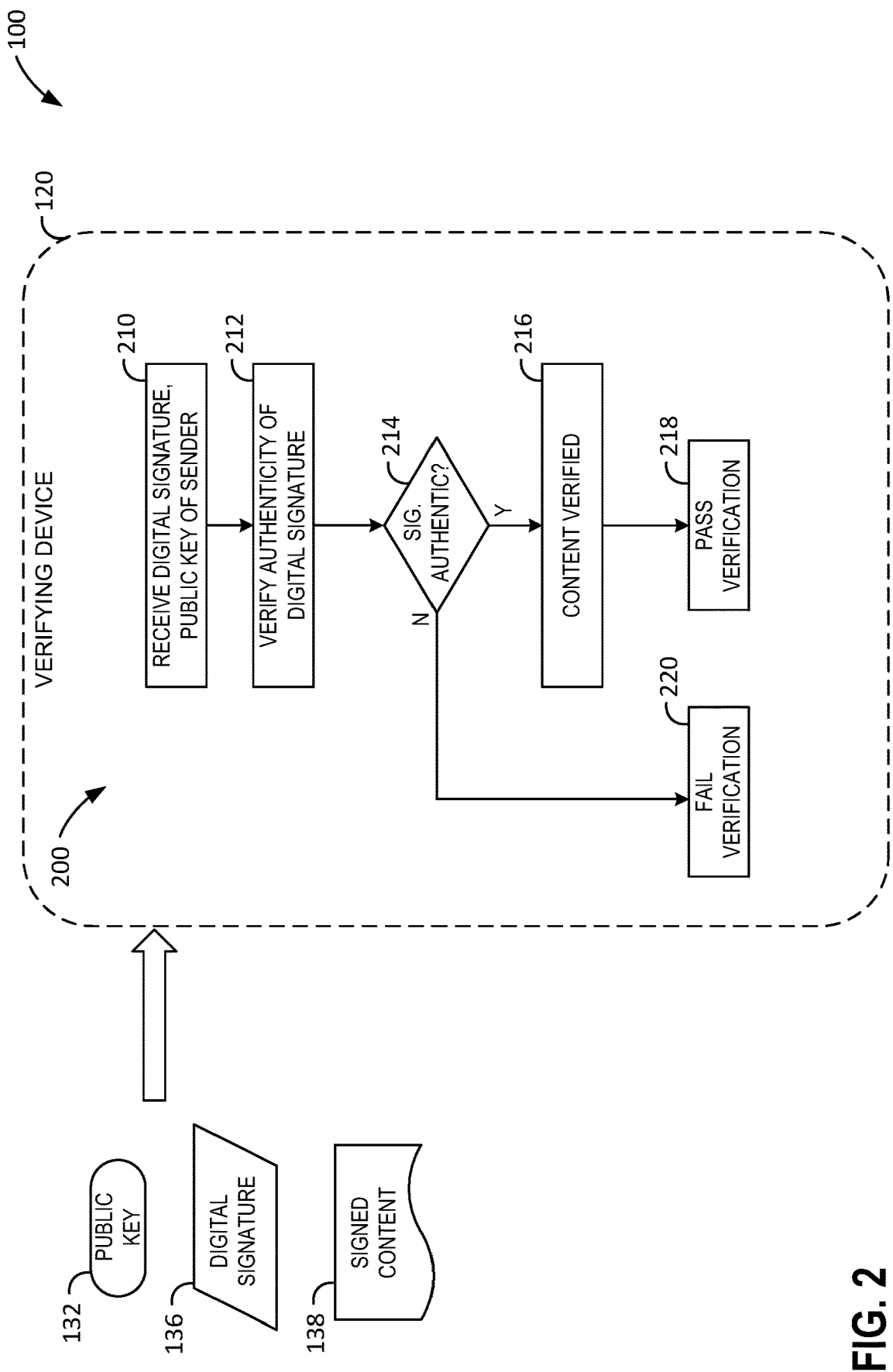
FIG. 2 is a diagram illustrating an example method for performing ECC digital signature authentication and content verification of the signed content by the verifying device shown in FIG. 1.

FIG. 2 is a diagram illustrating an example method 200 for performing ECC digital signature authentication and content verification of the signed content 138 by the verifying device 120 shown in FIG. 1. In an example, the method 200 is performed by the signature verification component 122 of the verifying device 120. The method 200 includes receiving the digital signature 136, the signed content 138, and the public key 132 of the sender at operation 210. At operation 212, the verifying device 120 verifies authenticity of the digital signature 212 using the public key 132, the digital signature 136, and the signed content 138 to determine whether or not the digital signature 136 is authentic. The digital signature verification of operation 212 is described in greater detail below with respect to FIG. 3.

If, at test 214, the digital signature 136 is not authentic, the verification process fails verification at operation 220 and the verifying device 120 cancels any planned use of the digital content 138. If, at test 214, the digital signature 136 is authentic, the integrity of the signed content 138 is verified at operation 216 and the verification process returns a passing verification at operation 218, thus allowing the verifying device 120 to proceed with use of the signed content.

Figure 3:
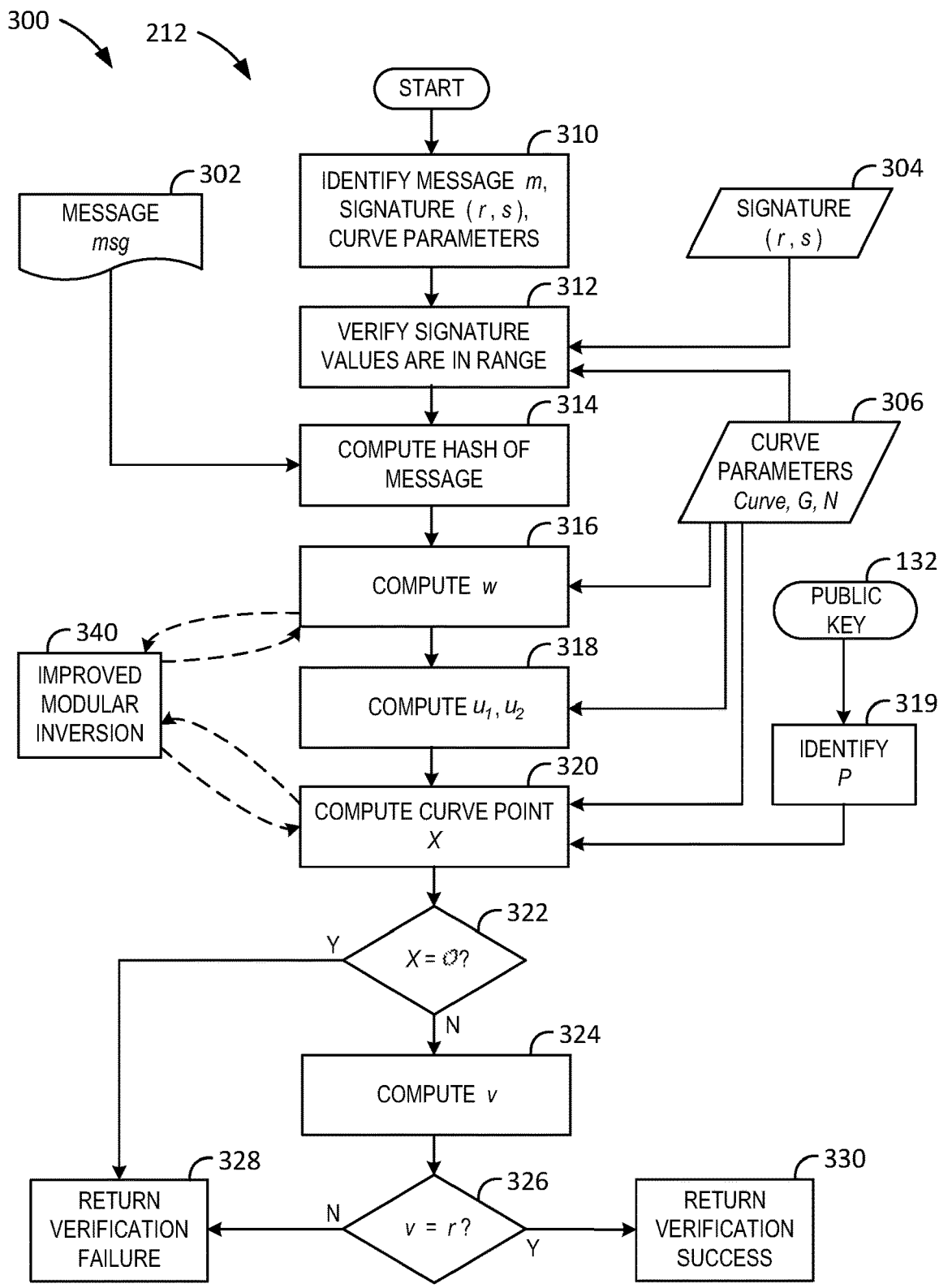
FIG. 3 is a flow chart illustrating an example embodiment of an ECC digital signature verification method such as the verification operation shown in FIG. 2.

FIG. 3 is a flow chart illustrating an example of an ECC digital signature verification method 300 such as the verification operation 212 shown in FIG. 2. The method 300 may be performed by the verification device 120 shown in FIG. 1. In the example, the method 300 operates to inspect and validate or reject a digital signature 304 associated with a message 302 and created using elliptic curve cryptography and the public key 132. The digital signature 304 may be similar to the digital signature 136, and the message 302 may be similar to the signed content 138, both as shown in FIGS. 1 and 2. It should be understood that method 300 presents a modified ECC public key encryption algorithm using modifications to known Euclidean algorithms, and that, for purposes of brevity, may leave out description of some well known aspects of known ECC public key encryption and Euclidean algorithms and that are not central to the novelties provided by the method 300, but such additional steps may be implied within the method 300 that enable practice of the method 300 for its stated purposes.

In this example, the message 302 is represented as a string of text, msg, that may be of any size (e.g., in bytes), and the signature 304 includes two integer values, r and s, which may be sized (e.g., in bits) based on the security settings of the digital signature 304. Some example sizes include 128 bits, 384 bits, or the like. In some examples, higher bit security settings are possible. The method 300 also uses various curve parameters 306, such as an elliptic curve field and equation, Curve (e.g., the parameters defining the elliptic curve), a prime, p, an elliptic curve base point, G, and an integer order or size of the elliptic curve, N.

At operation 310, the verification device 120 identifies (e.g., receives from the signing device 110 or the like) the message 302, the signature 304, the curve parameters 306, and other data used by the method, such as the public key 132 associated with this signature 304. At operation 312, the verification device 120 verifies that the signature values r, s are within a valid range (1, N). At operation 314, the verification device 120 computes a hash of the message 302, e=HASH(msg), where HASH is the same hash function used to create the public key, and where e is a resulting integer value of the HASH( ) function. In an example, the method 300 uses a hash function from the Secure Hash Algorithm ("SHA") family of cryptographic hash functions, such as SHA-0, SHA-256, SHA-512, or the like, where in other examples, other hash functions may be used.

In an example, at operation 316, the verification device 120 computes an intermediate variable:

$$w = s^{-1} \bmod N, \qquad (1)$$

where $s^{-1}$ is an inverse modulo operation on one of the signature integers, s. At operation 318, the verification device 120 computes two additional intermediate variables:

$$u_1 = ew \bmod N;$$

$$u_2 = rw \bmod N.$$

The verification device 120 then computes the curve point, X, at operation 320:

$$X = u_1 G + u_2 P, \qquad (2)$$

where P is identified from the public key 132 at operation 319 and G is included in the curve parameters 306.

If, at test 322, the curve point, X, is the identity element, O, then the signature verification has failed and a verification failure is returned at operation 328. If, at test 322, the curve point, X, is not the identity element, O, then the verification device 120 computes v=x mod N, where x is the x-axis component of the curve point, X. If, at test 326, v≠r, then the signature verification has failed and a verification failure is returned at operation 328. If, at test 326, v=r, then the signature verification has succeeded and a verification success is returned at operation 330.

It should be noted that operations 316 and 320 involve computing inverses. For example, equation (1) computes an inverse of s, namely $s^{-1}$ mod N. Further, in some embodiments, the elliptic curve is represented in projective coordinates, leading to equation (2) to include a few modular inversions. In projective coordinates, each point is represented with three coordinates, (x, y, z). With such a representation, point addition does not use an inverse operation, but the number of multiplications is at least doubled and the representation of a point is no longer unique. In the example embodiment, the elliptic curve is represented in affine coordinates. In affine representation, each point is represented with two coordinates, (x, y). In this case, each point addition or point doubling operation performs an inverse. For example, point addition performs three or four multiplications and one inverse, and the representation of each point (x, y) is unique. As such, computation of equation (2) performs hundreds of point additions and point doublings. For example, consider the computation of a portion of equation (2), namely the component $u_1 G$. If $u_1$ is represented in binary, consider the MSB of $u_1$ (e.g., as 1) and initialize X=G and compute point doubling of X (e.g., X=X+X). Next, look at the next bit of $u_1$ and, if it equals one, then compute X=X+G (e.g., point addition) and follow by point doubling, X=X+X. Otherwise, if the second bit is zero, compute just point doubling, X=X+X. This continues until the least significant bit ("LSB") of $u_1$ is computed.

The method 300 provides an improved modular inversion at operation 340 that is used to compute each of these inverses. The improved modular inversion 340 provides modifications to the traditional Euclidean algorithms for computing inverses that reduces burdens in processing, memory usage, storage needs for large integers (e.g., integers of >32 bits). These improvements scale higher as the size of the integers increases (e.g., higher bit sizes). The example embodiment provides an efficient and low complexity algorithm to avoid computational complexity, reduce chip area, and reduce power consumption (e.g., in hardware embodiments). The improved modular inversion operation 340 is described in greater detail in FIGS. 5A-5C.

Figure 4:
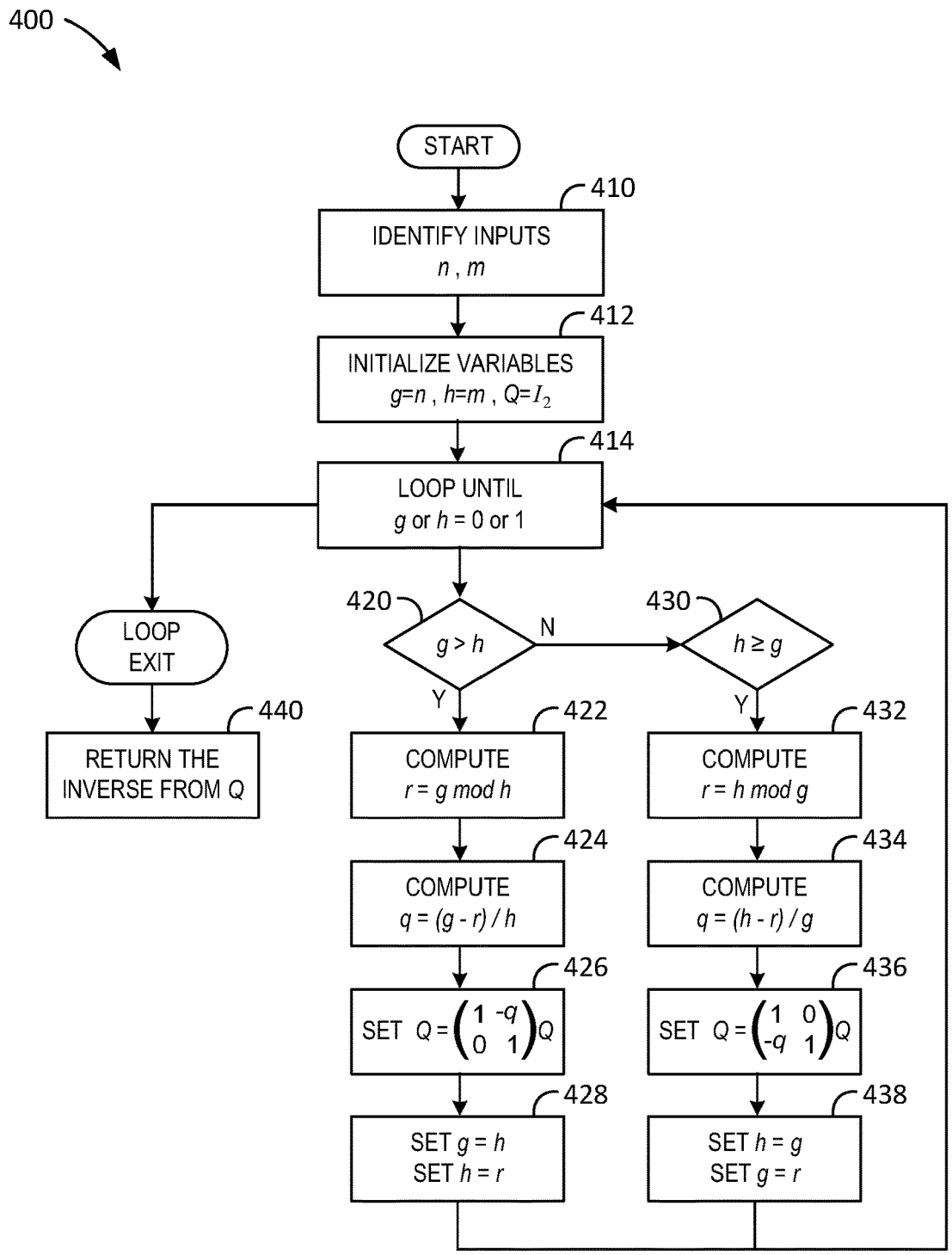
FIG. 4 is a flow chart of a conventional method for computing modular inverses (or just "inverses") using the Euclidean algorithms.

FIG. 4 is a flow chart of a conventional method 400 for computing modular inverses (or just "inverses") using the Euclidean algorithms. In some examples, the method 400 may be used to compute inverses in method 300 (e.g., in lieu of using the improved modular inversion 340) and may be performed by the verifying device 120. For example, for integers of 32 bits or less, the method 300 may be configured to use method 400 in lieu of the improved modular inversion 340. In an example, the method 400 includes identifying two integer inputs n and m at operation 410. Regarding inverses, in these examples, these inputs n and m are the components of an equation for the solution of a modular inverse $x = n^{-1}$ (mod m), which can also be represented as the equivalency nx(mod m)≡1, where x is in the range (0, ..., m−1). At operation 412, the verifying device 120 initializes variables g=n, h=m, and a matrix Q as the 2×2 identity matrix, $I_2$. The method 400 includes, at operation 414, a loop that is performed until either g or h are equal to 0 or 1. During each iteration, if, at test 420, g is greater than h, then the verifying device 120 performs operations 422-428, where otherwise, if, at test 430, h is greater than or equal to g, then the verifying device 120 performs operations 432-438.

For the g>h thread, in the example embodiment, the verifying device 120 computes an interim "remainder" value r=g mod h at operation 422. At operation 424, the verifying device 120 computes an interim "quotient" value q=(g−r)/h. At operation 426, the verifying device 120 updates the matrix Q as:

$$Q = \begin{pmatrix} 1 & -q \\ 0 & 1 \end{pmatrix} Q.$$

This line of operations concludes with the verifying device 120 setting g=h and h=r at operation 428. Similarly, for the h≥g thread, the verifying device 120 computes the interim "remainder" value r=h mod g at operation 432. At operation 434, the verifying device 120 computes the interim "quotient" value q=(h−r)/g. At operation 436, the verifying device 120 updates the matrix Q as:

$$Q = \begin{pmatrix} 1 & 0 \\ -q & 1 \end{pmatrix} Q.$$

This line of operations concludes with the verifying device 120 setting h=g and g=r at operation 438.

As such, at each iteration, each of the variables g and h are getting reduced through one of the lines of operations. The loop at operation 414 concludes when either g or h is equal to 0 or 1. When the loop exit criteria is met, the verifying device 120 identifies and returns the inverse based on the final state of the matrix Q. More specifically, one of the non-zero, non-determinant elements of Q will contain the resultant value of the inverse, either $Q_{1,2}$ or $Q_{2,1}$. The output may include performing a MOD n or MOD m operation to map the output into the appropriate range. While FIG. 4 provides some level of detail regarding an implementation of Euclid's algorithm that can compute and return modular inverses, it should be understood that other operations and details well known in the art may have been excluded for purposes of convenience, but may be included in the method 400.

Figure 5A:
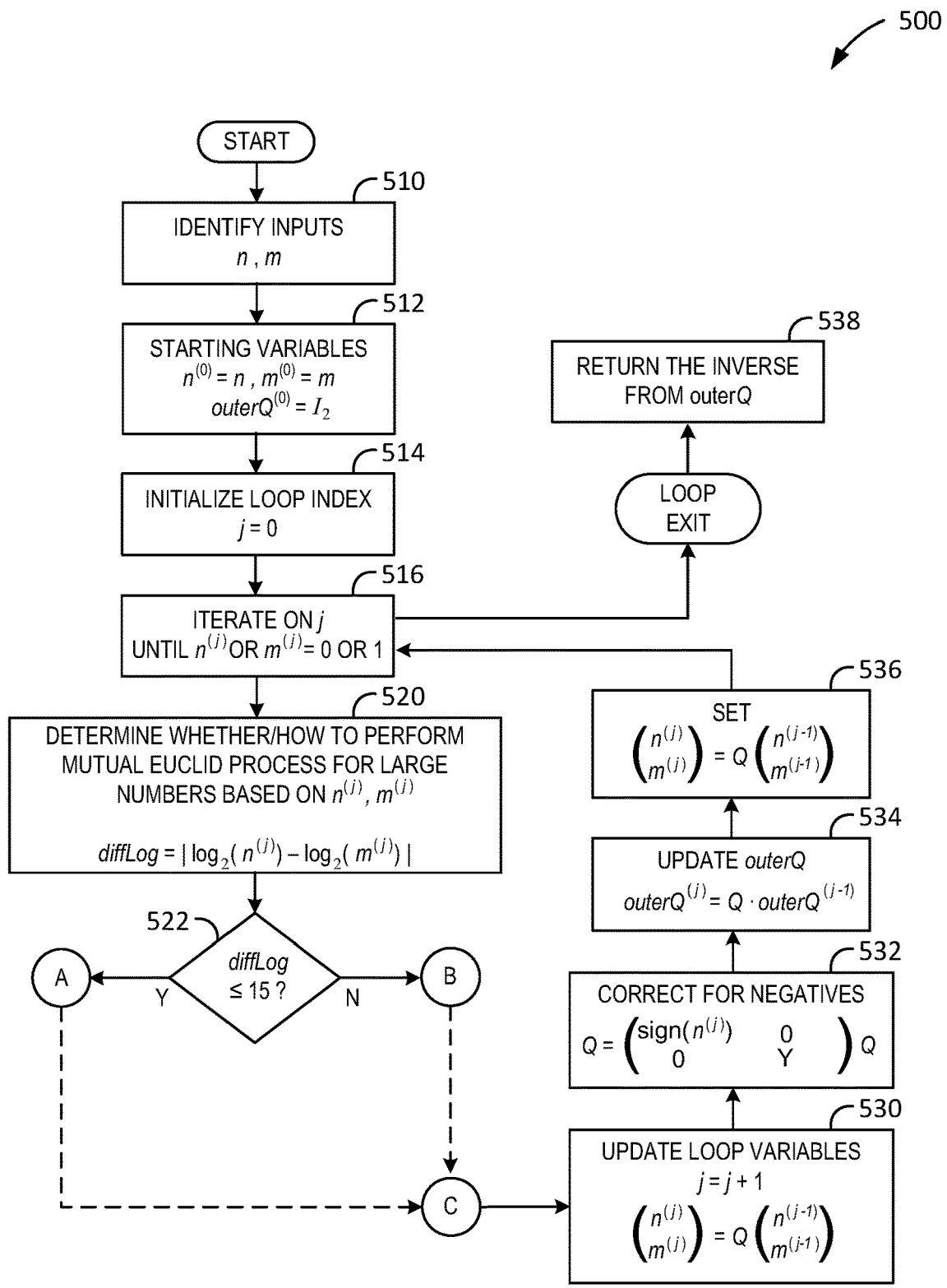
FIGS. 5A-5C are flow charts illustrating an example method for calculating modular inverses that provides computational improvements and benefits over the conventional method shown in FIG. 4 when large integers are involved.
Figure 5B:
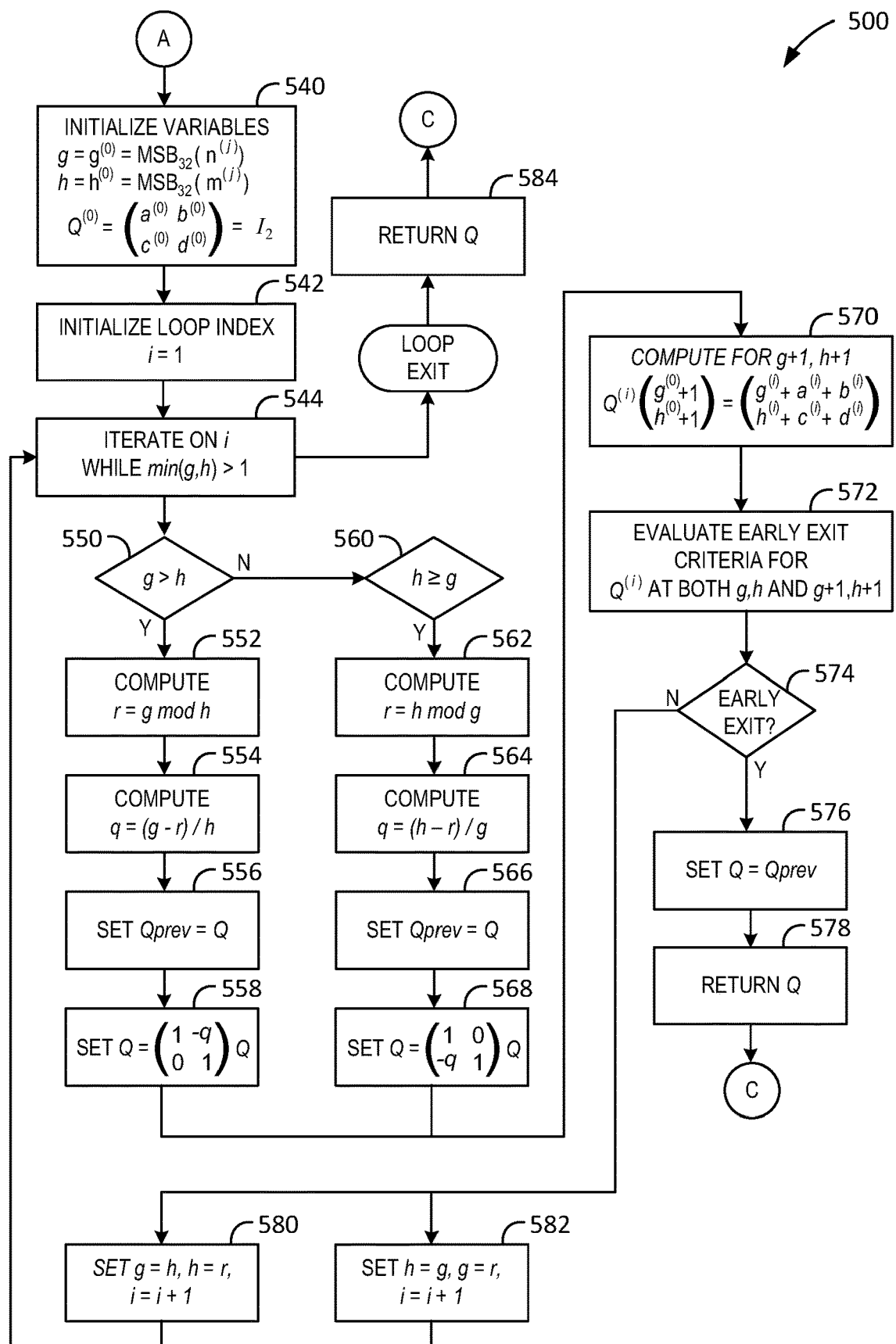
Figure 5C:
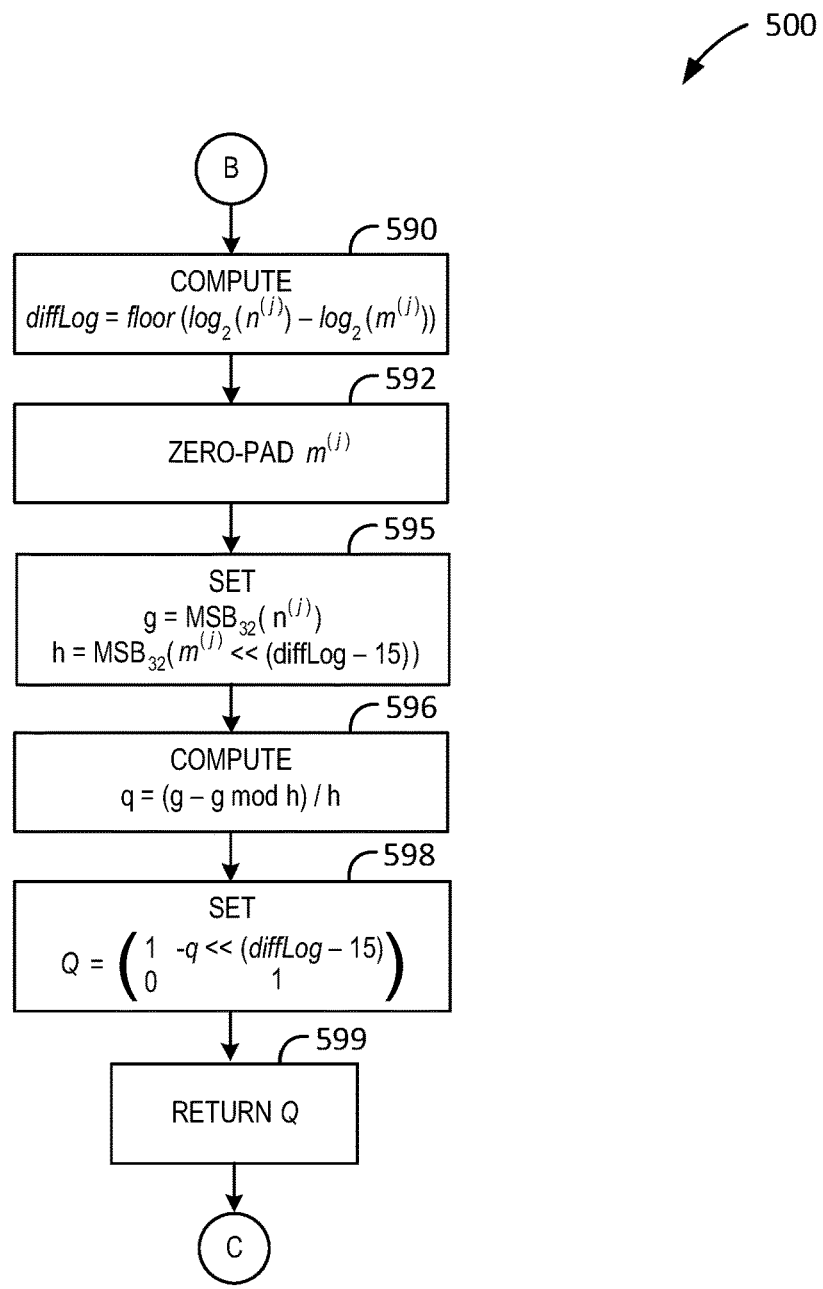

FIGS. 5A-5C are flow charts illustrating an example method 500 for calculating modular inverses that provides computational improvements and benefits over the conventional method 400 shown in FIG. 4 when large integers are involved. In an example, the method 500 is performed by the verification device 120 shown in FIG. 1 as a part of the improved modular inversion operation 340 shown in FIG. 3 during verification of digital signatures. In other examples, the method 500 may be performed when computing modular inverses during signature generation (e.g., by the signing device 110 shown in FIG. 1), or when encrypting or decrypting content. In FIGS. 5A-5C, the method 500 provides an "outer loop" indexed by the variable j, and an "inner loop" indexed by the variable i. In the description provided below, it should be understood that some variables and data structures change through execution of the method 500. To facilitate illustration and explanation of this method 500, parenthetical superscripts are used to denote a variable or data structure at a particular iteration (e.g., either of j or of i, depending on context). For example, $n^{(j)}$ refers to the value of the variable n at the j-th iteration.

Referring now to FIG. 5A, in an example, the verification device 120 identifies inputs n and m at operation 510. In this example, and similar to FIG. 4, these inputs n and m are the components of an equation for the solution of a modular inverse $x=n^{-1} \pmod{m}$, which can also be represented as the equivalency $nx \pmod{m} \equiv 1$, where x is in the range $(0, \ldots, m-1)$. At operation 512, the verifying device 120 establishes variables with starting values of $n^{(0)}=n$, $m^{(0)}=m$, and defines a matrix $outerQ^{(0)}$ as the 2×2 identity matrix, $I_2$. The method 500 also includes, at operation 514, initializing a loop index, j, that is used for an outer loop that begins at operation 516, iterating on j until either n or m are equal to 0 or 1.

In this example, it is presumed that the variables n and m are large integers (e.g., integers in bit sizes consistent with security levels of digital signatures under ECC, such as 160 bits, 256 bits, 384 bits, 512+ bits, or the like). During each iteration of the outer loop, the verification device 120 determines how to perform the improved "mutual Euclid process" described herein based on the current sizes of n and m at the current iteration. More specifically, at operation 520, the verification device 120 computes a diff Log between the two values:

$$\text{diff Log} = \text{floor} = (|\log_2(n^{(j)}) - \log_2(m^{(j)})|),$$

which represents the difference, in number of bits, between n and m at the j-th iteration. If, at test 522, diff Log is less than or equal to 15 (e.g., if the difference in bits needed to represent n and m is within 15 bits of each other), then the method 500 branches to "A", and the set of operations shown on FIG. 5B for this j-th iteration. Otherwise, at test 522, the method 500 branches to "B", and the set of operations shown on FIG. 5C for this j-th iteration. In this example test 522, diff Log represents a difference, in number of bits (e.g., log base 2), between $n^{(j)}$ and $m^{(j)}$, and the value 15 represents a threshold, in bits, for determining whether to perform branch "A" or branch "B" for this j-th iteration. This threshold value is approximately half of 32 bits, an integer size setting used in both FIGS. 5B and 5C (e.g., when selecting a number of most significant bits ("MSBs")). It should be understood that both the branch threshold of 15 for diff Log at test 522 and the integer size setting of 32 for MSBs are provided for example purposes but each may be other values (e.g., 32 and 64), or a different ratio between the two values (e.g., one quarter, three quarters, or such).

In an example, and as will be described in greater detail below, each of these branches "A" and "B" of FIGS. 5B and 5C, respectively, operate on the current values of $n^{(j)}$ and $m^{(j)}$ to generate and return a matrix, Q (or "innerQ"), that will be used to modify n, m, and outerQ upon returning to marker "C" as shown here in FIG. 5A. More specifically, upon returning from either branches "A" or "B", the verifying device 120 increments the loop counter, j=j+1, and updates variables n and m based on the returned Q matrix with:

$$\binom{n^{(j)}}{m^{(j)}} = Q \binom{n^{(j-1)}}{m^{(j-1)}}$$

at operation 530. At operation 532, the verifying device 120 corrects for negatives based on which branch the test 522 dictated for this iteration, with:

$$Q = \begin{pmatrix} \text{sign}(n^{(j)}) & 0 \\ 0 & Y \end{pmatrix} Q,$$

where, when returning from the "A" branch, $Y=\text{sign}(m^{(j)})$, and when returning from the "B" branch, $Y=1$. At operation 534, the verifying device 120 updates the outer matrix outerQ using the returned inner matrix, Q, as:

$$\text{outer}Q^{(j)} = Q \cdot \text{outer}Q^{(j-1)},$$

and, at operation 536, the verifying device 120 updates n and m variables again with:

$$\binom{n^{(j)}}{m^{(j)}} = Q \binom{n^{(j-1)}}{m^{(j-1)}}$$

before returning to loop operation 516.

As described above, this outer loop iterates until either $n^{(j)}$ or $j^{(j)}$ is equal to 0 or 1. Upon meeting this exit criteria, the outer loop is exited. At operation 538, the method 500 identifies the resultant inverse from the outerQ matrix and returns that value. The inverse will be in a column of Q. In the vector representation $$\binom{n^{(j)}}{m^{(j)}}$$

where n is the first coordinate and m is the second coordinate, then the inverses modulo n will appear in the second column of Q and inverses modulo m appear in the first column of Q. If the last vector $$\binom{n^{(j)}}{m^{(j)}} = \binom{1}{*},$$

then use the element in the first row, otherwise use the element in the second row. The output may include performing a MOD n or MOD m operation to map the output into the appropriate range.

As shown in FIG. 5A and described above, the test 522 branches to either "A" or "B" based on the value of diff Log relative to the branch threshold. When the size of $n^{(j)}$ is less than or equal to the branch threshold (e.g., when the value of integers $n^{(j)}$ and $m^{(j)}$ are within 15 bits' representation of each other), the method 500 branches to "A" and performs the operations shown in FIG. 5B.

Referring now to FIG. 5B, the operations shown in FIG. 5B provide an improved implementation of Euclid's algorithm with modifications that operate on integers of reduced size (e.g., integers reduced down to the most significant bits 32 bits of n and m) and an inner loop that controls additional early exit criteria. More specifically, at operation 540, the verification device 120 initializes a set of variables used for this j-th iteration, each of which are used during the inner loop. Two integer variables g and h are set to:

$$g = g^{(0)} = \mathrm{MSB}_{32}(n^{(j)}), \text{ and}$$

$$h = h^{(0)} = \mathrm{MSB}_{32}(m^{(j)}),$$

where $\mathrm{MSB}_{32}$ signifies the most significant 32 bits of the given integer, and where 32 is the example integer size setting for this method 500. It should be understood that g and h, in this example, are 32-bit integers used in this inner loop. Further, it should be understood that the superscripts of g and h are similarly used to represent the values of those particular variables at a particular iteration, but these superscripts represent the inner loop index, i, defined below. In addition, it should be understood that superscripts of the variables g, h, and Q are excluded in some instances in FIG. 5B (e.g., for purposes of simplification and clarity) and that when superscripts are excluded, it is the current value of that variable that is referenced. At operation 540, the method 500 also includes establishing an inner matrix, Q (or "innerQ"), that is returned to be used in FIG. 5A as described above, and that is initially set to the 2×2 identity matrix:

$$Q = Q^{(0)} = \begin{pmatrix} a^{(0)} & b^{(0)} \\ c^{(0)} & d^{(0)} \end{pmatrix} = I_2 = \begin{pmatrix} 1 & 0 \\ 0 & 1 \end{pmatrix}.$$

As such, at each iteration, i, of the of the inner loop, described below, the loop has the following variables and data structures:

$$h^{(i)},$$

$$g^{(i)}, \text{ and}$$

$$Q^{(i)} = \begin{pmatrix} a^{(i)} & b^{(i)} \\ c^{(i)} & d^{(i)} \end{pmatrix},$$

where a, b, c, and d represent the component values of each position in the matrix, Q, and thus where $a^{(i)}$, $b^{(i)}$, $c^{(i)}$ and $d^{(i)}$ represent the component values of each position at iteration i.

In an example, at operation 542, the verifying device initializes the loop variable for this inner loop, i=0, and at operation 544, the inner loop begins, iterating on i while min(g, h)>1. The inner loop provides two threads of operation based on the current values of g and h (e.g., $g^{(i)}$ and $h^{(i)}$). When g>h at test 550, the inner loop performs operations 552-558. More specifically, at operation 552, the verification device 120 computes remainder r=g mod h. At operation 554, the verification device 120 computes quotient q=(g−r)/h. At operation 556, the verification device 120 sets a temporary matrix Qprev=Q. At operation 558, the verification device 120 sets Q equal to:

$$Q = \begin{pmatrix} 1 & -q \\ 0 & 1 \end{pmatrix} Q.$$

Returning to test 550, when g is not greater than h, then h≥g at test 560, and the inner loop performs operations 562-568. More specifically, at operation 562, the verification device 120 computes remainder r=h mod g. At operation 554, the verification device 120 computes quotient q=(h−r)/g. At operation 556, the verification device 120 sets a temporary matrix Qprev=Q. At operation 558, the verification device 120 sets Q equal to:

$$Q = \begin{pmatrix} 1 & 0 \\ -q & 1 \end{pmatrix} Q.$$

After the inner loop performs either operations 552-558 or operations 562-568, the following equality and inequality hold true:

$$Q^{(i)} \begin{pmatrix} g^{(0)} \\ h^{(0)} \end{pmatrix} = \begin{pmatrix} g^{(i)} \\ h^{(i)} \end{pmatrix},$$

and where:

$$\begin{pmatrix} g^{(i)} \\ h^{(i)} \end{pmatrix} < \begin{pmatrix} g^{(i-1)} \\ h^{(i-1)} \end{pmatrix},$$

with at least one of these inequalities being strict. In other words, through each iteration, one of g and h are decreasing.

Recall that, in the examples described herein, g and h began as only the 32 most significant bits of input integers n and m, respectively. As such, $Q^{(i)}$ may not necessarily be suitable for n and m (e.g., may diverge). Accordingly, operations 570 and 572 test for an early exit to this inner loop based on how $Q^{(i)}$ performs with $g^{(0)}+1$ and $h^{(0)}+1$ (e.g., how many bits are reduced, as compared to g and h). More specifically, at operation 570, the verification device 120 applies $Q^{(i)}$ to a vector having $g^{(0)}+1$ and $h^{(0)}+1$:

$$Q^{(i)} \begin{pmatrix} g^{(0)}+1 \\ h^{(0)}+1 \end{pmatrix} = \begin{pmatrix} g^{(i)}+a^{(i)}+b^{(i)} \\ h^{(i)}+c^{(i)}+d^{(i)} \end{pmatrix}.$$

At operation 572, the verification device 120 evaluates for early exit criteria using $Q^{(i)}$ at both g, h and g+1, h+1. Recall that:

$$Q^{(i)} \begin{pmatrix} g^{(0)} \\ h^{(0)} \end{pmatrix} = \begin{pmatrix} g^{(i)} \\ h^{(i)} \end{pmatrix}.$$

As such, the verification device 120 evaluates two inequalities when considering how $Q^{(i)}$ performs:

$$\begin{pmatrix} g^{(i)}+a^{(i)}+b^{(i)} \\ h^{(i)}+c^{(i)}+d^{(i)} \end{pmatrix} < 2 \cdot \begin{pmatrix} g^{(i)} \\ h^{(i)} \end{pmatrix}, \quad (3)$$

and $$\begin{pmatrix} g^{(i)}+a^{(i)}+b^{(i)} \\ h^{(i)}+c^{(i)}+d^{(i)} \end{pmatrix} < \begin{pmatrix} g^{(i-1)} \\ h^{(i-1)} \end{pmatrix}. \quad (4)$$

Inequality (3) may be represented in the form of:

$$|a^{(i)}|+|b^{(i)}| \leq g^{(i)} \text{ and } |c^{(i)}|+|d^{(i)}| \leq h^{(i)}, \quad (5)$$

and inequality (4) may also be represented in the form of:

$$g^{(i)}+|a^{(i)}|+|b^{(i)}| \leq g^{(i-1)} \text{ and } h^{(i)}+|c^{(i)}|+|d^{(i)}| \leq h^{(i-1)}. \quad (6)$$

As such, and for example, inequality (5) may be used to postulate that, if $Q^{(i)}$ reduces k bits out of $g^{(0)}$ (e.g., if $g^{(i)}$ is k bits less than, $g^{(0)}$), then $Q^{(i)}$ will also reduce at least k−1 bits out of $g^{(0)}+1$. Accordingly, $Q^{(i)}$ is determined to be an effective Euclid matrix for both $g^{(0)}$, $h^{(0)}$, and for $g^{(0)}+1$, $h^{(0)}+1$.

In some situations (e.g., later iterations of the inner loop), one or more of the values of $g^{(i)}$ and $h^{(i)}$ may become small relative to their respective quantities $a^{(i)}+b^{(i)}$ or $c^{(i)}+d^{(i)}$, and thus may cause inequality (5) to not be satisfied. As such, equation (4) and inequality (6) serve to evaluate such situations. More specifically, inequality (6) uses values from the prior iteration, namely $g^{(i-1)}$ and $h^{(i-1)}$, then $Q^{(i)}$ applied to $g^{(0)}+1$, $h^{(0)}+1$ has done at least as well $Q^{(i-1)}$ does when applied to $g^{(0)}$, $h^{(0)}$.

At test 574, if both inequalities (5) and (6) are not satisfied, then an early exit is performed and ongoing performance of this inner loop is terminated. In other words, once the current $Q^{(i)}$ is not sufficiently performing against both $g^{(0)}$, $h^{(0)}$ and $g^{(0)}+1$, $h^{(0)}+1$, then the loop is terminated with an early exit. Logically, another way to express this early exit test is:

when $g>h$: if $(r+|Q_{1,1}|+|Q_{1,2}|>g)$ and $(|Q_{1,1}|+|Q_{1,2}|>r)$ then early exit, when $h≥g$: if $(r+|Q_{2,1}|+|Q_{2,2}|>h)$ and $(|Q_{2,1}|+|Q_{2,2}|>r)$ then early exit.

Accordingly, when an early exit is identified at test 574, Q is set to Qprev (e.g., the prior known-sufficient Q) at operation 576 and is returned at operation 578 (e.g., branching back to "C" of FIG. 5A).

If, at test 574, either or both of the inequalities (5) and (6) are satisfied, then the inner loop continues. More specifically, and depending on which branch of operations are being performed during this iteration, the verifying device 120 increments the loop variable i and updates the variables g and h, either setting g=h and h=r (e.g., when this iteration has performed operations 552-558) at operation 580, or setting h=g and g=r (e.g., when this iteration has performed operations 562-568) at operation 582. After updating variables g and h, the method 500 returns to operation 544, iterating on i while the smaller of g and h is greater than 1. Once either g or h reaches 1 or lower, the inner loop terminates and exits, and the current matrix Q is returned at operation 584 (e.g., branching back to "C" of FIG. 5A).

Returning to FIG. 5A, and as described above, the test 522 branches to either "A" or "B" based on the value of diff Log relative to the branch threshold. When the size of $n^{(j)}$ is greater than the branch threshold (e.g., when the value of integers $n^{(j)}$ and $m^{(j)}$ are greater than 15 bits' representation of each other), the method 500 branches to "C" and performs the operations shown in FIG. 5C.

Referring now to FIG. 5C, in this situation, the difference between $n^{(j)}$ and $m^{(j)}$ is quite large. The operations 590-598 operate on the variables n and m during the j-th iteration, as well as create temporary variables g, h, and q. Presume, in this example, that $n^{(j)}$ is the greater number, $m^{(j)}$ is the smaller number, and the minimal number of bits needed to represent the integers n and m are determined as $\log_2(n^{(j)})$ and $\log_2(m^{(j)})$, respectively. It should be understood that, while this example presumes n is smaller than m, these operations can be easily altered by one of ordinary skill in the art to address the situation where m is the larger integer. At operation 590, the validating device 120 computes:

diff Log=floor($\log_2(n^{(j)})-\log_2(m^{(j)})$).

In this example embodiment, diff Log represents the difference in the number of bits needed to represent $n^{(j)}$ and $m^{(j)}$.

At operation 592, the validating device 120 ensures that both $n^{(j)}$ and $m^{(j)}$ are represented with the same number of bits. If $m^{(j)}$ has less bits than $n^{(j)}$, then the validating device 120 pads the $m^{(j)}$ variable with zeros until they have the same number of bits. At operation 595, in the example embodiment, the verifying device 120 defines two integer variables g and h and sets those variables to:

$g=MSB_{32}(n^{(j)})$, and $h=MSB_{32}(m^{(j)}<<(diff\ Log-15))$, where $MSB_{32}$ signifies the most significant 32 bits of the given integer, and where 32 is the example integer size setting for this method 500, and where a bitwise left-shift (identified by the operator "<<") is performed on the value of the variable m shifting by a number of bits equal to (diff Log−15). At operation 596, the verifying device 120 computes a quotient q=(g−g·mod h)/h. At operation 598, the verifying device 120 creates a 2×2 matrix Q and sets that matrix to:

$$Q = \begin{pmatrix} 1 & (-q<<(diff\text{Log}-15)) \\ 0 & 1 \end{pmatrix},$$

where the variable −q is left bitwise shifted by diff Log−15 bits. At operation 599, the method 500 returns the matrix Q.

Returning now to FIG. 5A, both scenarios of branch "A" and branch "B" return a matrix Q that is used to identify the modular inverse of n and m once the outer loop has completed. Both of these branches provide a reduction in computational demands at least in part by operating on smaller integers (e.g., by looking at only the 32 most significant bits of n and m, which may start as many hundreds of bits). After each iteration of the outer loop, the number of bits in n or m are reduced, either by the operations of the "A" branch or by the operations of the "B" branch. The method 500 thus provides a mixed approach to solving various modular inverses that includes a different set of steps to perform when the two integers are of a significantly different size, as well as performing a modified Euclidean approach that uses only the most significant bits of the two integers rather than the full sized integers themselves.

In some embodiments, each iteration 516 of the method 500 may additionally include a test prior to operation 520 based on the remaining number of bits of n and m. More specifically, when both n and m are beneath a size threshold (e.g., 32 bits or less remaining), the method 500 may divert to perform the remaining analysis using the traditional method 400 shown in FIG. 4.

Returning then to FIG. 3, when the method 500 of FIGS. 5A-5C is used for modular inverse operations in the improved modular inversion operation 340, in the digital signature verification process 300 or in other related or unrelated processes that use modular inverses, the improved processes described herein provide computational benefits over known methods, reducing computational overhead, processing requirements, memory requirements, and power requirements that may be beneficial in many embodiments. It should be understood that the methods described herein may be provided in software or may be implemented in hardware (e.g., as a component in an electronic device).

In another example embodiment, aspects of the method 500 described above may be used in signature generation under ECC. For example, for EC signature generation for a message, msg, the signing device 110 may select a random or pseudorandom integer k, where 1<k<n, where k is cryptographic random. The signing device 110 may then compute kG=($x_1$, $y_1$) and r=$x_1$ mod n. If r=0, go back and choose a different k. The signing device 110 may then compute $k^{-1}$ mod n, compute SHA(m) and convert to an integer, e, and compute s=$k^{-1}$(e+dr)mod n. If s=0, then go back and choose a different k. Otherwise, publish (r, s) as the digital signature for msg. Such a use case also similarly involves inverse operations. Further, if affine coordinates are used, then there is at least one inverse operation at each of the steps performed for computing kG.

In some embodiments, aspects of the method 500 may be used with RSA cryptography. In RSA cryptography, n=p*q, where p and q are secret primes. A pair of keys (d, e) are generated, where e is public and d is kept secret. As such, (n, e) is published and p, q, and d are secret. The public key is typically a small integer and d is a very large integer. Generating an RSA signature for a message, msg, includes computing $m^d$ mod n. This can be a lengthy process, as d is large. However, the signing device 110 knows p and q, so may also compute φ(n)=(p-1)(q-1). For any x<n, and coprime to n, $x^{φ(n)}$=1 mod n, so $m^d$ mod n=$(m^{-1})^{φ(n)-d}$ mod n. If φ(n)–d is much smaller than d, it may be beneficial to compute the inverse of m and raise it to the power φ(n)–d instead of raising m to the power of d.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device. Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
receiving a message and a digital signature associated with a signing party and the message, the digital signature being created by the signing party using a private key of a key pair;
verifying authenticity of the digital signature using elliptic curve cryptography (ECC) and a public key of the key pair, the verifying including one or more computations involving computing modular inverses, wherein computing modular inverses comprises:
identifying a first integer and a second integer of a modular inverse operation, the first integer representing an inverse number, the second integer representing a modulus;
performing a first iterative process that, at each iteration:
initializes a third integer with a pre-defined number of most significant bits of the first integer and a fourth integer with a pre-defined number of most significant bits of the second integer; and
computes a quotient and a remainder using the third integer and the fourth integer;
determining a resultant inverse value for the modular inverse operation based, at least in part, on the quotient; and
confirming the authenticity of the digital signature based, at least in part, on the resultant inverse value; and
authenticating use of the message based, at least in part, on the confirmed authenticity of the digital signature.

2. The method of claim 1, wherein the one or more computations involving computing modular inverses includes computing at least one curve point on an elliptic curve using at least one modular inverse operation.

3. The method of claim 1, wherein computing modular inverses further comprises:
identifying a pre-defined branch threshold;
computing a size difference, in bits, between a value of the first integer and a value of the second integer; and
branching between a first set of operations and a second set of operations based on a comparison between the size difference and the pre-defined branch threshold.

4. The method of claim 3, wherein the first set of operations includes performing Euclid's algorithm on the third integer and the fourth integer, wherein the second set of operations includes performing a left bitwise shift of the smaller of the third and fourth integers.

5. The method of claim 3, wherein the first iterative process is invoked by and performed inside of an outer iterative process, and wherein branching between a first set of operations and a second set of operations is performed as a part of the outer iterative process.

6. The method of claim 5, wherein the first iterative process includes evaluating an interim matrix of values against:
(i) a first vector of initial values g and h; and
(ii) a second vector of values g+1 and h+1, wherein the first iterative process includes early exit criteria based at least in part on the evaluations.

7. The method of claim 6, wherein the first iterative process includes terminating the first iterative process based, at least in part, on the early exit criteria, and wherein terminating the first iterative process includes returning a prior version of the interim matrix to the outer iterative process.

8. A computing device comprising:
a memory storing a software package and a digital signature associated with a signing party and the software package, the digital signature being created by the signing party using a private key of a key pair; and
at least one processor, coupled to the memory, executing instructions that cause the at least one processor to:
receive the software package, the digital signature, and a public key of the signing party;
verify authenticity of the digital signature using elliptic curve cryptography (ECC) and a public key of the key pair, the verifying including one or more computations involving computing modular inverses, wherein computing modular inverses comprises:
identifying a first integer and a second integer of a modular inverse operation, the first integer representing an inverse number, the second integer representing a modulus;
performing a first iterative process that, at each iteration:
initializes a third integer with a pre-defined number of most significant bits of the first integer and a fourth integer with a pre-defined number of most significant bits of the second integer; and
computes a quotient and a remainder using the third integer and the fourth integer;
determining a resultant inverse value for the modular inverse operation based, at least in part, on the quotient; and
confirming the authenticity of the digital signature based, at least in part, on the resultant inverse value; and
initiate installation of the software package on the computing device based, at least in part, on the confirmed authenticity of the digital signature.

9. The computing device of claim 8, wherein the one or more computations involving computing modular inverses includes computing at least one curve point on an elliptic curve using at least one modular inverse operation.

10. The computing device of claim 8, wherein computing modular inverses further comprises:
identifying a pre-defined branch threshold;
computing a size difference, in bits, between a value of the first integer and a value of the second integer; and
branching between a first set of operations and a second set of operations based on a comparison between the size difference and the pre-defined branch threshold.

11. The computing device of claim 10, wherein the first set of operations includes performing Euclid's algorithm on the third integer and the fourth integer, wherein the second set of operations includes performing a left bitwise shift of the smaller of the third and fourth integers.

12. The computing device of claim 10, wherein the first iterative process is invoked by and performed inside of an outer iterative process, and wherein branching between a first set of operations and a second set of operations is performed as a part of the outer iterative process.

13. The computing device of claim 12, wherein the first iterative process includes evaluating an interim matrix of values against:
(i) a first vector of initial values g and h: and
(ii) a second vector of values g+1 and h+1, wherein the first iterative process includes early exit criteria based at least in part on the evaluations.

14. The computing device of claim 13, wherein the first iterative process includes terminating the first iterative process based at least in part on the early exit criteria, and wherein terminating the first iterative process includes returning a prior version of the interim matrix to the outer iterative process.

15. A non-volatile memory storing instructions that, when executed by at least one processor, cause the at least one processor to:
- receive a message and a digital signature associated with a signing party and the message, the digital signature being created by the signing party using a private key of a key pair;
- verify authenticity of the digital signature using elliptic curve cryptography (ECC) and a public key of the key pair, the verifying including one or more computations involving computing modular inverses, wherein computing modular inverses comprises:
  - identifying a first integer and a second integer of a modular inverse operation, the first integer representing an inverse number, the second integer representing a modulus;
  - performing a first iterative process that, at each iteration:
    - initializes a third integer with a pre-defined number of most significant bits of the first integer and a fourth integer with a pre-defined number of most significant bits of the second integer; and
    - computes a quotient and a remainder using the third integer and the fourth integer;
  - determining a resultant inverse value for the modular inverse operation based, at least in part, on the quotient; and
  - confirming the authenticity of the digital signature based, at least in part, on the resultant inverse value; and
- authenticate use of the message based, at least in part, on the confirmed authenticity of the digital signature.

16. The non-volatile memory of claim 15, wherein the one or more computations involving computing modular inverses includes computing at least one curve point on an elliptic curve using at least one modular inverse operation.

17. The non-volatile memory of claim 15, wherein computing modular inverses comprises further comprises:
- identifying a pre-defined branch threshold;
- computing a size difference, in bits, between a value of the first integer and a value of the second integer; and
- branching between a first set of operations and a second set of operations based on a comparison between the size difference and the pre-defined branch threshold.

18. The non-volatile memory of claim 17, wherein the first set of operations includes performing Euclid's algorithm on the third integer and the fourth integer, and wherein the second set of operations includes performing a left bitwise shift of the smaller of the third and fourth integers.

19. The non-volatile memory of claim 17, wherein the first iterative process is invoked by and performed inside of an outer iterative process, and wherein branching between a first set of operations and a second set of operations is performed as a part of the outer iterative process.

20. The non-volatile memory of claim 19, wherein the first iterative process includes evaluating an interim matrix of values against:
  (i) a first vector of initial values g and h; and
  (ii) a second vector of values g+1 and h+1, wherein the first iterative process includes early exit criteria based at least in part on the evaluations.

* * * * *